(12) United States Patent
Tsujita

(10) Patent No.: US 7,331,813 B2
(45) Date of Patent: Feb. 19, 2008

(54) PLUG-SOCKET ASSEMBLY

(75) Inventor: Satoshi Tsujita, Tokyo (JP)

(73) Assignee: Nitto Kohki Co., Ltd., Tokyo (JP)

( * ) Notice: Subject to any disclaimer, the term of this patent is extended or adjusted under 35 U.S.C. 154(b) by 0 days.

(21) Appl. No.: 11/635,264

(22) Filed: Dec. 7, 2006

(65) Prior Publication Data

US 2007/0087612 A1    Apr. 19, 2007

Related U.S. Application Data

(63) Continuation of application No. PCT/JP2005/009649, filed on May 26, 2005.

(30) Foreign Application Priority Data

Jun. 9, 2004    (JP) .............................. 2004-171883

(51) Int. Cl.
    *H01R 4/50*    (2006.01)
(52) U.S. Cl. ...................................................... 439/348
(58) Field of Classification Search ................ 439/348, 439/352, 583, 578, 346
    See application file for complete search history.

(56) References Cited

U.S. PATENT DOCUMENTS

| | | | | |
|---|---|---|---|---|
| 2,521,701 | A | * | 9/1950 | Earle et al. ................. 285/277 |
| 3,032,359 | A | * | 5/1962 | Cator .......................... 285/277 |
| 3,165,340 | A | * | 1/1965 | Kuehl et al. ................. 285/316 |
| 4,431,334 | A | | 2/1984 | Cleveland et al. .......... 403/322 |
| 4,508,407 | A | * | 4/1985 | Ball ............................ 439/312 |
| 4,824,386 | A | * | 4/1989 | Souders ...................... 439/133 |
| 6,716,048 | B2 | * | 4/2004 | Collin et al. ................. 439/317 |
| 2003/0082942 | A1 | * | 5/2003 | Wlos ........................... 439/348 |

FOREIGN PATENT DOCUMENTS

CA        1196208        11/1985

(Continued)

OTHER PUBLICATIONS

International Search Report, International App. No. PCT/JP2005/009649, Jul. 5, 2005.

*Primary Examiner*—Michael C. Zarroli
*Assistant Examiner*—Phuongchi Nguyen
(74) *Attorney, Agent, or Firm*—Brinks Hofer Gilson & Lione

(57) ABSTRACT

An object of the present invention is to provide a plug/socket assembly in which the plug will never pull out of the socket even if an excessive pull-out force is applied to the plug. A plug/socket assembly (10) comprises a plug (20) and a socket (30) for receiving and fixing the plug (20) therein. The socket (30) includes a socket main body (31) having a plug insertion hole (311), balls (32) which are provided with the socket main body (31) in a radially displaceable manner with respect to the plug insertion hole (311), a sleeve (33) which is mounted over the outer surface of the socket main body (31) and is displaceable along the axial direction of the plug insertion hole (311), and a compression spring (34) for urging the sleeve (33) along the axial direction toward the inlet port (313) of the plug insertion hole. The inner surface of the sleeve is provided with a slide surface (332). The slide surface has first to fourth regions (P1-P4). The fourth region (P4) is shaped such that with an external pull-out force being applied to the plug, even if the balls apply a radially outward force to the slide surface, no leftward force to push back the sleeve will be produced.

10 Claims, 7 Drawing Sheets

| | FOREIGN PATENT DOCUMENTS | | |
|---|---|---|---|
| EP | 0 092 669 | 11/1983 | |
| JP | S55-113620 U | 8/1980 | |
| JP | 55-115626 | 9/1980 | |
| JP | 59-1812 | 1/1984 | |
| JP | 59-001812 | 1/1984 | |
| JP | 61-195986 | 12/1986 | |
| JP | S61-195986 | 12/1986 | |
| JP | S61-195986 U | 12/1986 | |
| JP | H01-82391 U | 6/1989 | |
| JP | H02-12591 U | 1/1990 | |
| JP | H06-19909 Y2 | 5/1994 | |
| JP | 2000-145802 A2 | 5/2000 | |
| JP | 2001-182726 | 7/2001 | |
| JP | 2001-182726 A2 | 7/2001 | |

\* cited by examiner

[Fig.1]
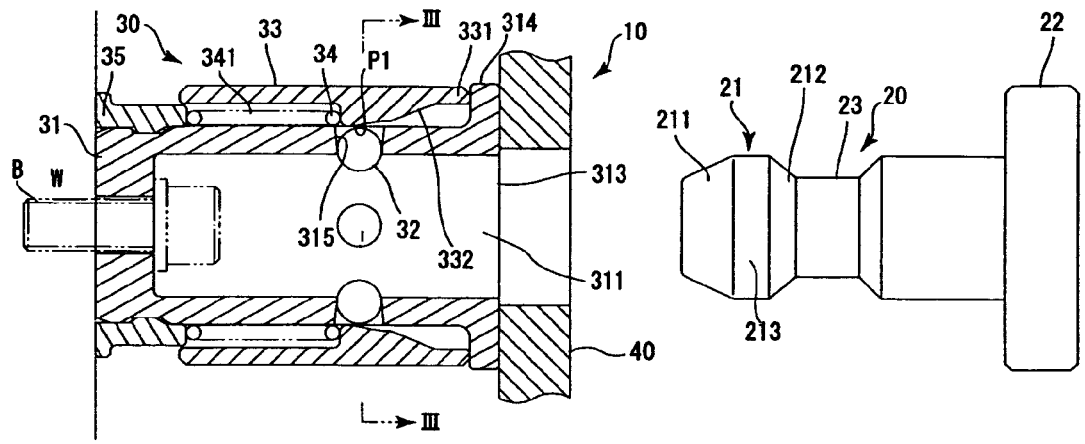
[Fig.2A]
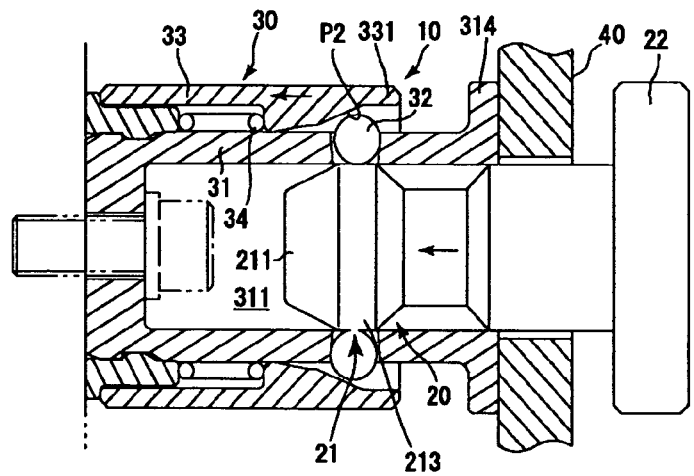
[Fig.2B]
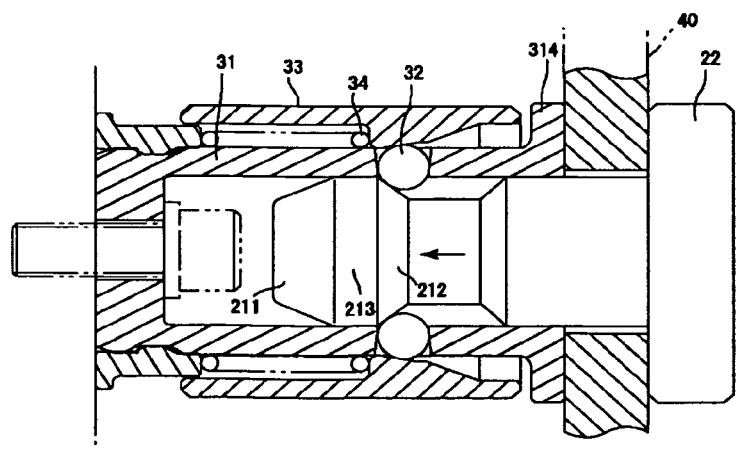

[Fig.2C]
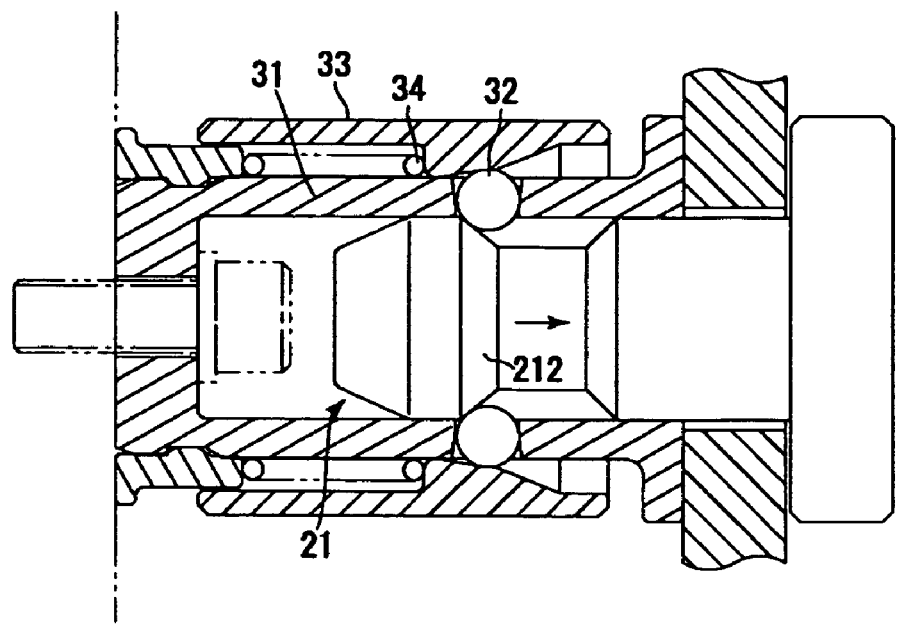
[Fig.3]
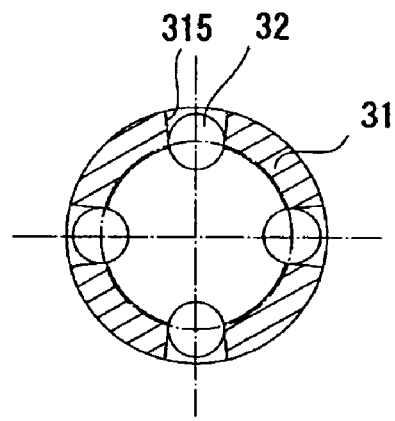
[Fig.4A]
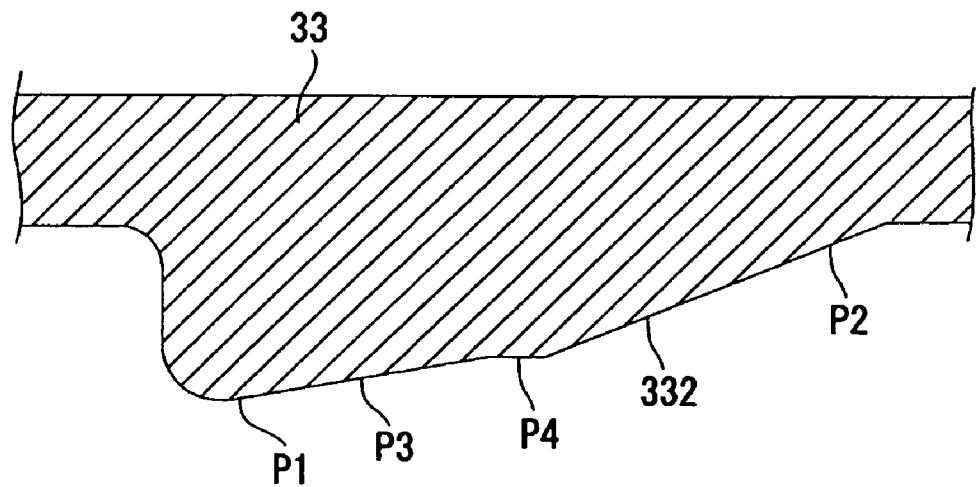

[Fig. 4B]
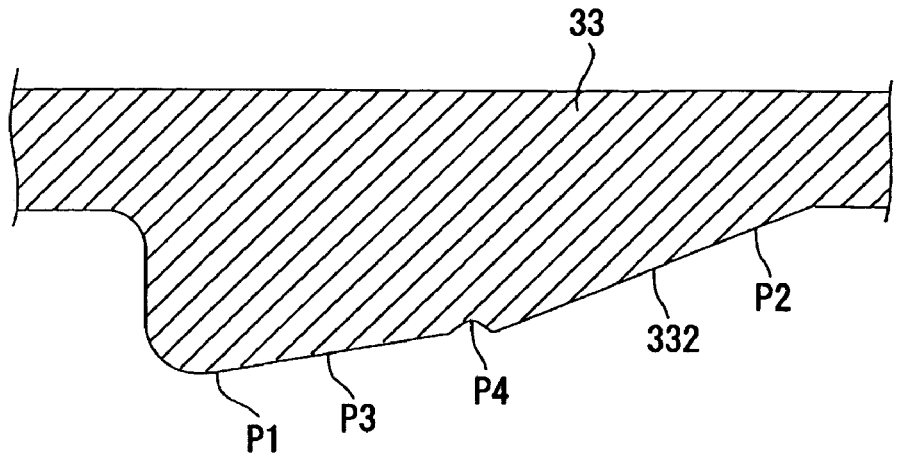
[Fig. 4C]
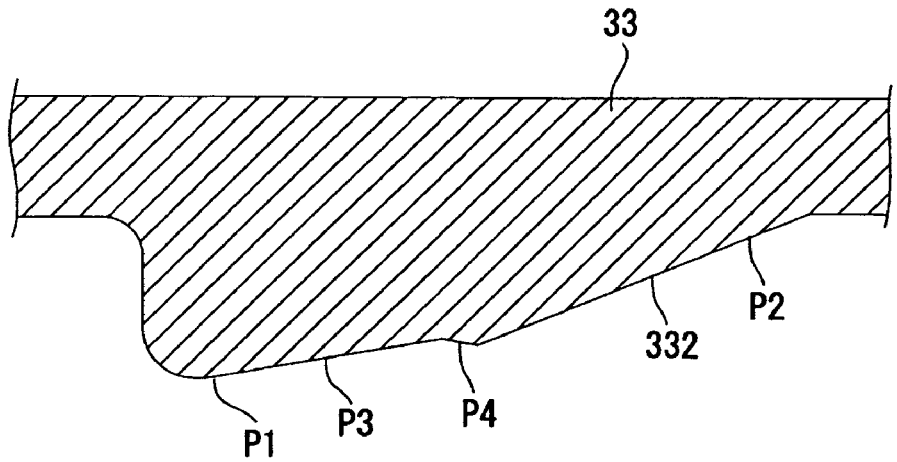
[Fig. 5]
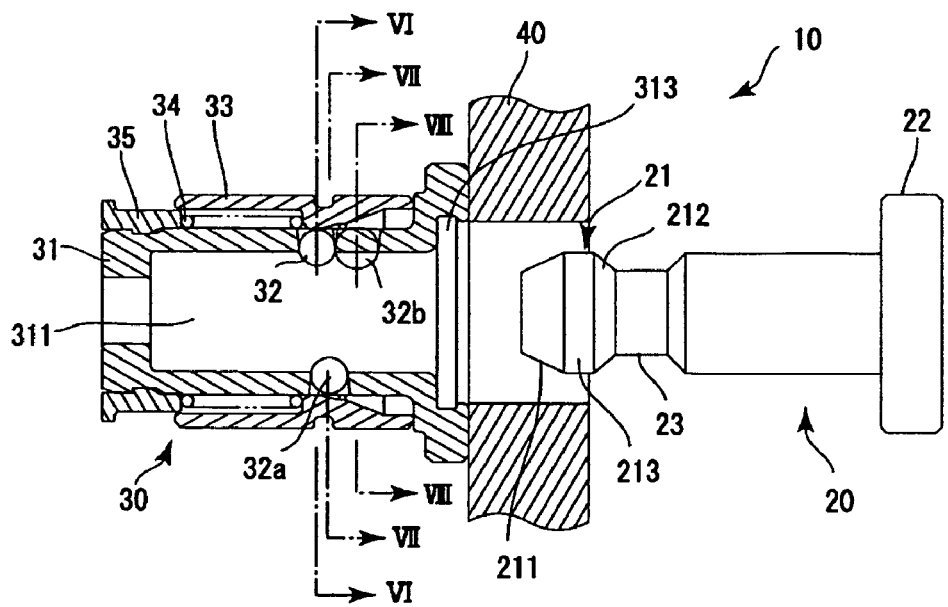

[Fig.6]
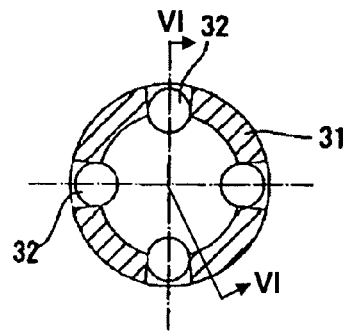
[Fig.7]
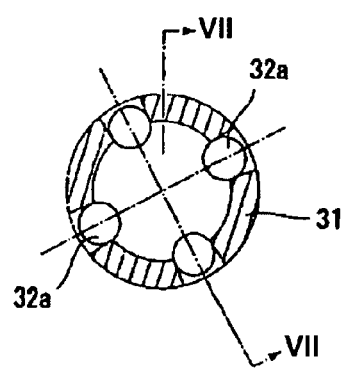
[Fig.8]
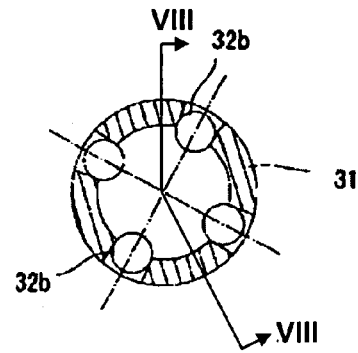
[Fig.9A]
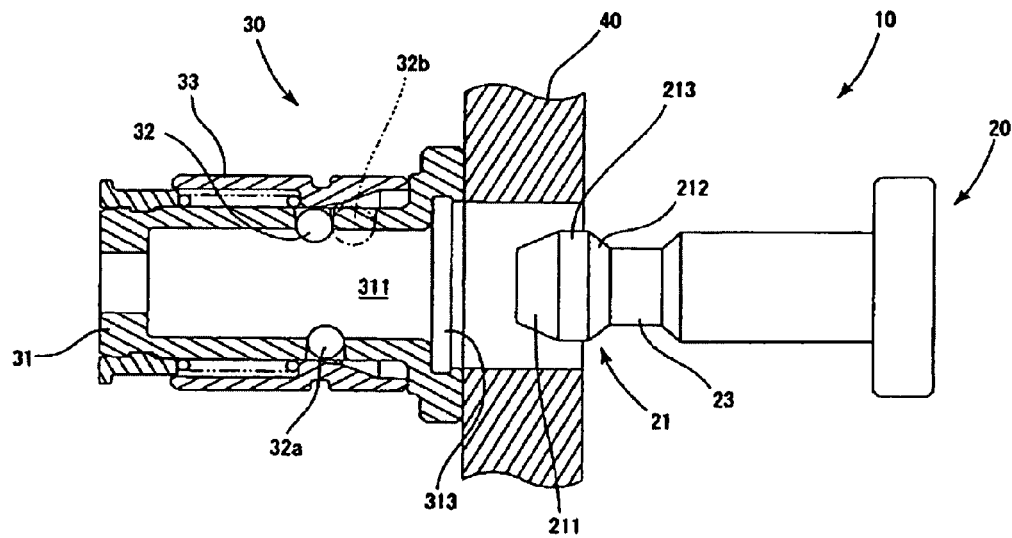

[Fig. 9B]
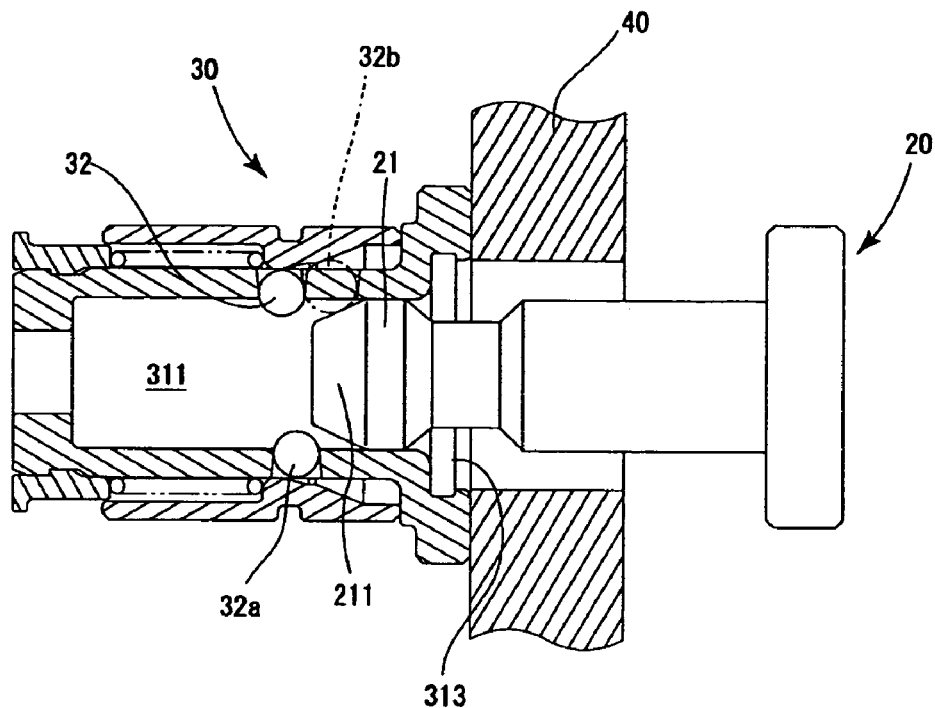
[Fig. 9C]
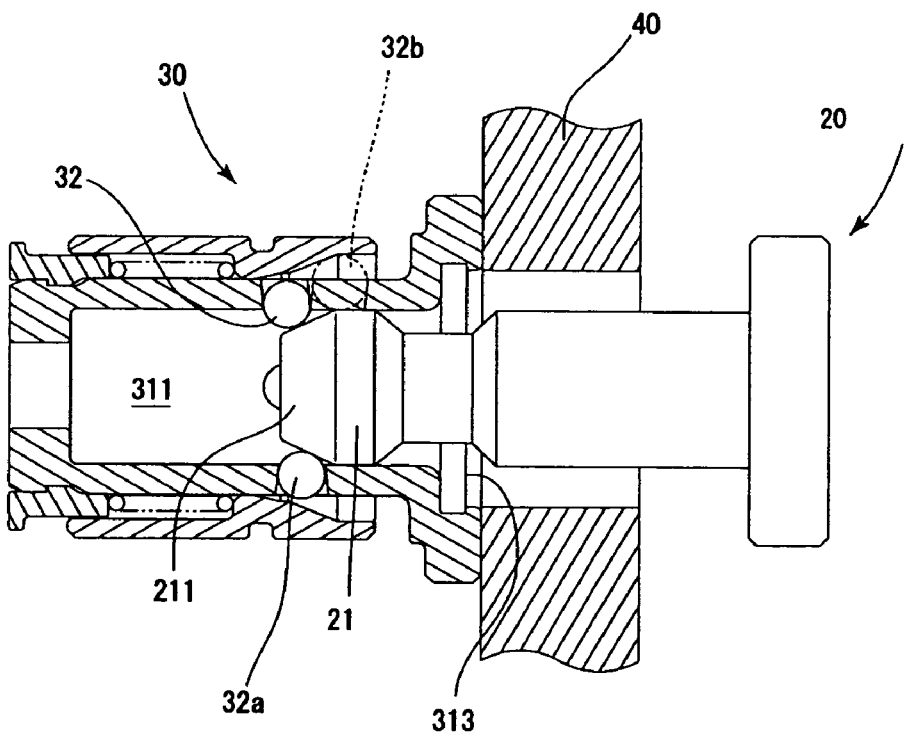

[Fig. 9D]
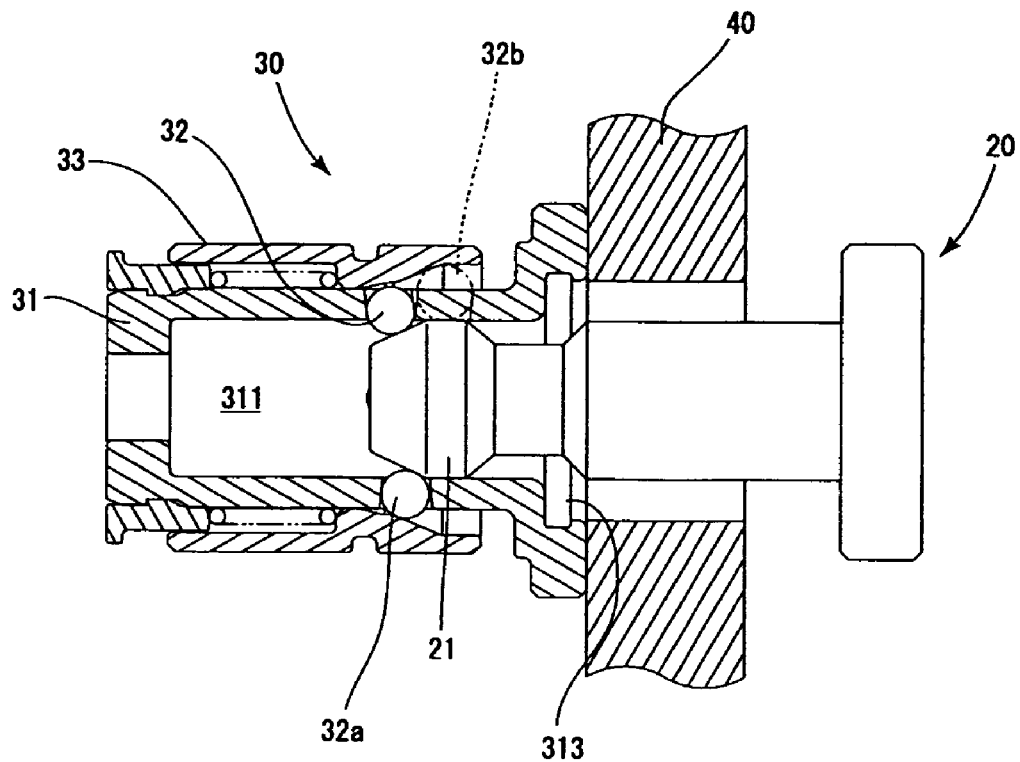
[Fig. 9E]
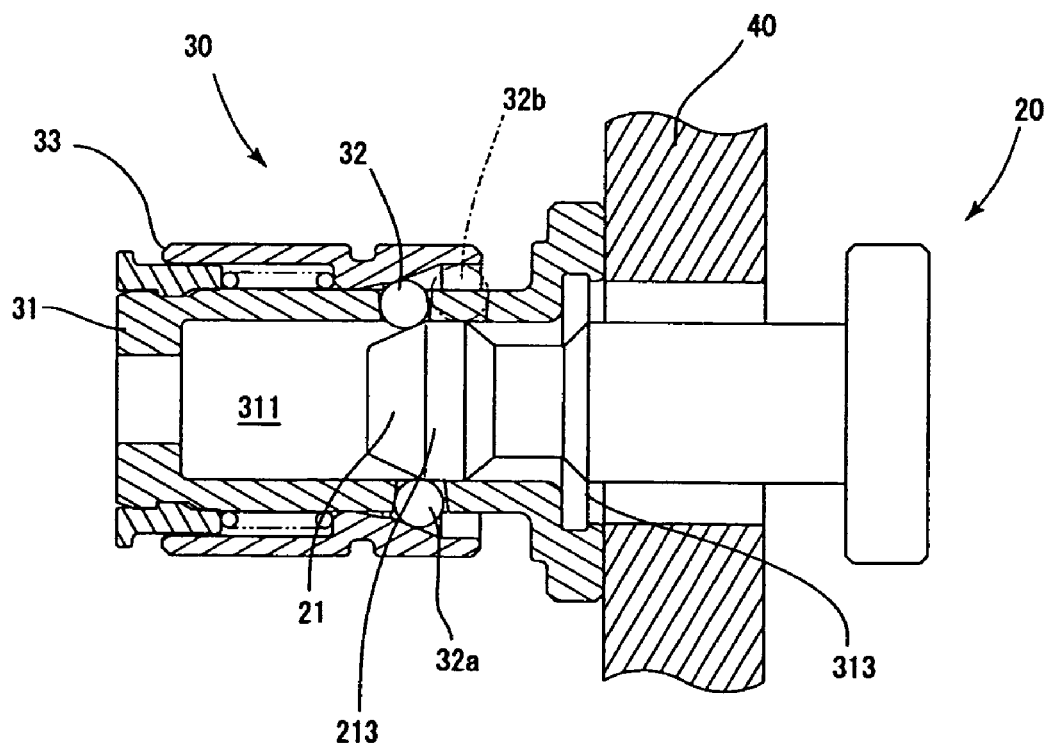

[Fig. 9F]
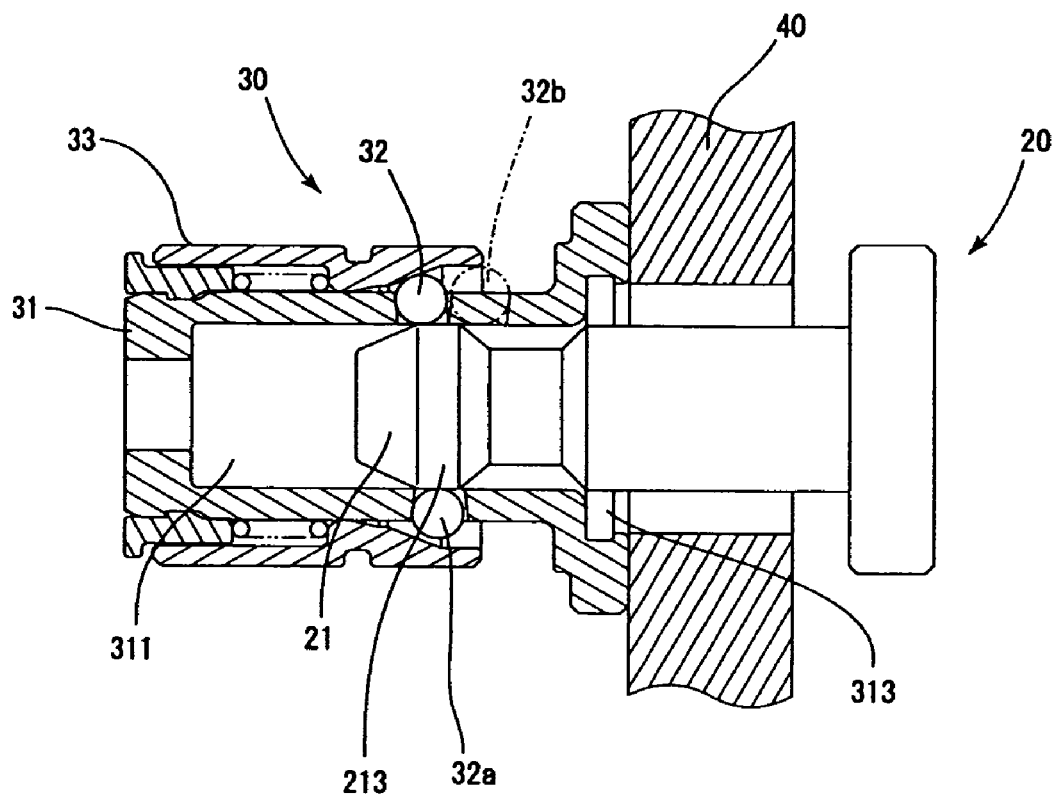
[Fig. 9G]
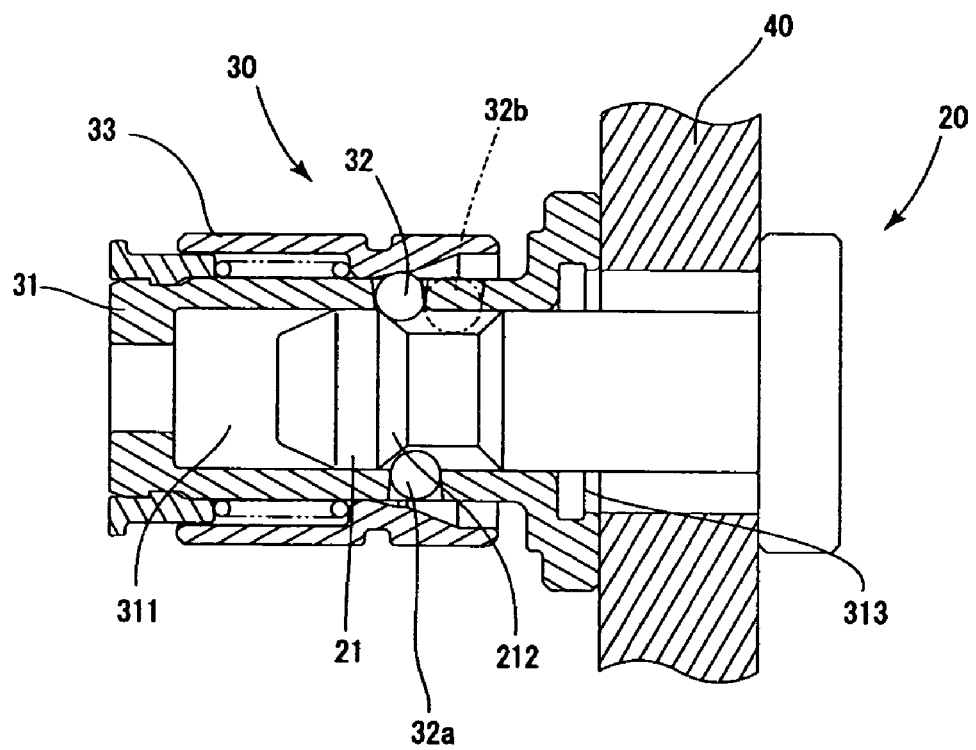

PLUG-SOCKET ASSEMBLY

This application is a continuation of PCT/JP2005/009649, filed May 26, 2005, which claims priority to Japanese Application No. 2004-171883, filed Jun. 9, 2004. The entire contents of these applications are incorporated herein by reference.

FIELD OF THE INVENTION

The present invention relates to a plug-socket assembly including a plug and a socket that receives and secures the plug. More particularly, the present invention relates to a plug-socket assembly suitable for use as a device for fastening an article.

BACKGROUND OF THE INVENTION

There is known a fastening device in which a socket is fixed to a wall, for example, and a plug is inserted into the socket and locked therein, thereby attaching to the wall a desired article such as a cover of lighting equipment previously attached to the plug. In order that the plug and the socket shall be surely connected together without play, the rear surface of the forward end head portion of the plug is formed into a slant surface that is sloped or extends radially inward toward the rear end thereof. A locking element fitted to the socket is resiliently pressed against the slant surface radially inward, thereby displacing the plug forward (i.e. drawing the plug into the socket; for example, see Japanese Patent Application Publication No. 2001-182726). In this type of fastening device, however, if an excessive pulling force is applied to the plug, the slant surface of the plug acts to displace the locking element radially outward, which may lead to a situation that the plug undesirably comes out of the socket.

SUMMARY OF THE INVENTION

An object of the present invention is to provide a plug-socket assembly in which the plug cannot come out of the socket even if an excessive external pulling force is applied to the plug.

A plug-socket assembly according to the present invention comprises a socket body having a plug insertion hole, a locking element fitted to the socket body so as to be displaceable in the radial direction of the plug insertion hole, a locking element-actuating member fitted to the outside of the socket body so as to be displaceable in the axial direction of the plug insertion hole, and a resilient member that urges the locking element-actuating member in the axial direction. The plug has a forward end head portion that is slidably inserted into the plug insertion hole of the socket. The forward end head portion has a slant rear surface that is sloped or extends radially inward toward the rear end thereof as viewed in the plug insertion direction.

The locking element-actuating member of the socket has a locking element sliding surface provided on the inner side thereof. The locking element sliding surface is sloped or extends radially outward in an urging direction in which the locking element-actuating member is urged by the resilient member. The locking element sliding surface presses and engages the locking element by being urged in the axial direction by the resilient member.

The locking element sliding surface of the socket has a first portion that engages the locking element to allow it to project as far as a first position in the plug insertion hole when the plug is not inserted in the plug insertion hole, and a second portion that is spaced apart from the first portion by a predetermined distance in the urging direction of the resilient member. When engaging the second portion, the locking element is displaced to a second position that is radially outward of the first position to allow the forward end head portion of the plug to be inserted into the plug insertion hole beyond the locking element. The locking element sliding surface further has a third portion that is closer to the first portion than the second portion. The third portion presses and engages the locking element that engages the slant rear surface of the forward end head portion of the plug when the forward end head portion of the plug is inserted beyond the locking element. Further, the locking element sliding surface has a fourth portion that engages the locking element at an intermediate position between the second portion and the third portion and that is configured so that even if the locking element applies a radially outward force to the locking element sliding surface, the locking element-actuating member will not be forced to move in a direction opposite to the urging direction.

In the plug-socket assembly according to the present invention, if an excessive force is applied to the plug so as to pull it out of the socket, the locking element is moved radially outward by the slant rear surface of the forward end head portion of the plug, causing the locking element-actuating member to move against the urging force of the resilient member. Even if such occurs, when the locking element reaches a position where it engages the fourth portion of the locking element sliding surface, there is no longer any force from the locking element that causes the locking element-actuating member to move in the axial direction. Accordingly, the radially outward movement of the locking element is blocked, and thus the plug is prevented from being undesirably pulled out.

To pull the plug out of the socket, the locking element-actuating member is moved against the urging force of the resilient member. By doing so, the plug and the socket can be disengaged from each other.

Preferably, the slope between the first portion and the fourth portion is less steep than the slope between the fourth portion and the second portion. The reason for this is as follows. The slope between the first portion and the fourth portion is preferably minimized in order to maximize the radially inward force transmitted from the resilient member to the locking element through the locking element-actuating member to thereby increase the force for drawing the plug into the plug insertion hole. On the other hand, the slope between the fourth portion and the second portion is preferably made steep in order that a small axial displacement of the locking element-actuating member shall allow the locking element to be displaced radially outward to a considerable extent (i.e. in order to minimize the axial length of the locking element-actuating member).

In order to allow the plug to be inserted into the plug insertion hole without moving the locking element-actuating member in the axial direction, balls that are displaceable radially outward by the forward end head portion of the plug may be used to be pressed against the slant surface between the fourth portion and the second portion to move the locking element-actuating member in the axial direction, as will be described later. In this regard also, the slope between the fourth portion and the second portion should be made steep to minimize the force required to insert the plug.

Specifically, the fourth portion may be formed to extend parallel to the axial direction of the plug insertion hole of the socket. The fourth portion may have a surface configuration facing opposite to the urging direction of the resilient member. The fourth portion may be a recess curved radially outward.

As has been stated above, in order to allow the plug to be inserted into the plug insertion hole without moving the locking element-actuating member, the plug-socket assembly may be arranged such that the forward end head portion of the plug is provided with a slant front surface extending radially inward in the plug insertion direction, and radially displaceable balls are provided at a position of the socket body closer to the inlet of the plug insertion hole than the locking element.

The slant front surface of the plug engages the balls when the plug is inserted into the plug insertion hole, and displaces the balls radially outward so that the balls engage and press against the locking element sliding surface between the fourth portion and the second portion, thereby displacing the locking element-actuating member in the direction opposite to the urging direction to move the locking element to a position between the fourth portion and the second portion. The slant front surface of the forward end head portion of the plug as inserted presses and engages the locking element in the above-described position, thereby displacing the locking element-actuating member in the axial direction.

Specifically, the balls may include first balls provided closer to the inlet of the plug insertion hole than the locking element, and second balls provided closer to the inlet of the plug insertion hole than the first balls.

The slant front surface of the plug first engages the second balls when the plug is inserted into the plug insertion hole, and displaces the second balls radially outward so that the second balls engage and press against the locking element sliding surface between the fourth portion and the second portion, thereby displacing the locking element-actuating member in the direction opposite to the urging direction. Subsequently, the slant front surface engages the first balls and displaces them radially outward so that the first balls engage and press against the locking element sliding surface between the fourth portion and the second portion, thereby displacing the locking element-actuating member in the direction opposite to the urging direction. Finally, the slant front surface engages the locking element and displaces it radially outward so that the locking element engages and presses against the locking element sliding surface between the fourth portion and the second portion, thereby displacing the locking element-actuating member in the direction opposite to the urging direction, and thus allowing the locking element to engage the second portion.

The plug may have at the rear end thereof a flange extending in the radial direction. The flange can clamp and secure a desired member between itself and the rear end of the socket body in a state where the locking element is pressed and engaged with the slant rear surface of the forward end head portion of the plug as inserted into the plug insertion hole. The desired member may be connected and secured to the plug so as to be attached by inserting and connecting the plug into the socket.

Preferably, the socket body is provided with a flange extending radially outward so that the forward end of the locking element-actuating member, as viewed in the urging direction in which it is urged by the resilient member, engages the flange when the plug is not inserted. The reason for this arrangement is to prevent the locking element-actuating member from hitting the first balls or the second balls when the locking element-actuating member is released after it has been pulled back by a manual operation and then pushed back by the resilient member.

In the plug-socket assembly according to the present invention, when the plug is inserted into the socket, the locking element engages the slant rear surface of the forward end head portion of the plug, and at this time, the slanted locking element sliding surface of the locking element-actuating member is engaged with the locking element, and the pressing force of a resilient member, e.g. a spring, is applied to the locking element, thereby applying drawing force to the plug in the plug insertion direction. By so doing, the plug is locked to the socket without play. In addition, even if an excessive pulling force is applied to the plug, the locking element sliding surface will not be displaced to such an extent as to release the locking element, which might otherwise occur in the prior art, but allows the locking element to remain in the engaging position with the forward end head portion of the plug, whereby the plug can be prevented from being pulled out of the socket.

BRIEF DESCRIPTION OF THE DRAWINGS

FIG. 1 is a longitudinal sectional view of the plug-socket assembly according to the first embodiment of the present invention.

FIG. 2A is a view for explaining the operation of the plug-socket assembly according to the first embodiment, which shows the way in which the sleeve is retracted by a manual operation to insert the plug, thereby allowing the balls serving as the locking element to be displaced radially outward, so that the forward end head portion of the plug inserted pushes the balls aside and is inserted further inside the plug insertion hole.

FIG. 2B is a view for explaining the operation of the plug-socket assembly according to the first embodiment, which shows the way in which the plug is further inserted from the position shown in FIG. 2A, and when the forward end head portion has passed the balls serving as the locking element, the sleeve is released, so that the sleeve is returned rightward by the compression spring, and the slant inner surface (sliding surface) of the socket engages the balls and displaces them radially inward, causing the balls to engage the slant rear surface of the forward end head portion of the plug.

FIG. 2C is a view for explaining the operation of the plug-socket assembly according to the first embodiment, which shows the way in which a rightward pulling force acts on the plug that is in the position shown in FIG. 2B, and the force is transmitted to the sleeve through the balls, causing the sleeve to move leftward, so that the horizontal fourth portion at an intermediate part of the slant inner surface (sliding surface) engages the balls to prevent transmission of leftward force to the sleeve.

FIG. 3 is a schematic cross-sectional view as seen from the line III-III in FIG. 1, showing an example of arrangement of the balls.

FIG. 4A is a fragmentary longitudinal sectional view of the sleeve in the first embodiment of the plug-socket assembly.

FIG. 4B is a fragmentary longitudinal sectional view of a sleeve having a sliding surface similar to that shown in FIG. 4A but modified.

FIG. 4C is a fragmentary longitudinal sectional view of a sleeve having another modified sliding surface.

FIG. 5 is a longitudinal sectional view of the plug-socket assembly according to the second embodiment of the present invention.

FIG. 6 is a schematic cross-sectional view as seen from the line VI-VI in FIG. 5, showing an example of ball arrangement.

FIG. 7 is a schematic cross-sectional view as seen from the line VII-VII in FIG. 5, showing an example of ball arrangement.

FIG. 8 is a schematic cross-sectional view as seen from the line VIII-VIII in FIG. 5, showing an example of ball arrangement.

FIG. 9A is a view for explaining the operation of the plug-socket assembly according to the second embodiment, which shows a state before the plug is inserted.

FIG. 9B shows a state where the insertion of the plug has been started, so that the forward end head portion of the plug has engaged the second balls and begun to move the sleeve leftward.

FIG. 9C shows a state where the insertion of the plug has proceeded, so that the forward end head portion of the plug has begun to engage the first balls.

FIG. 9D shows a state where the first balls have engaged the sliding surface of the sleeve by being pushed radially outward by the forward end head portion of the plug, and thus have begun to displace the sleeve leftward.

FIG. 9E shows a state where the balls serving as the locking element have begun to engage the sliding surface of the sleeve by being pushed radially outward.

FIG. 9F shows a state where the balls serving as the locking element have been engaged with the forward end head portion of the plug to engage the second portion of the sliding surface of the sleeve, thereby allowing the forward end head portion of the plug to be further inserted.

FIG. 9G shows a state where the forward end head portion of the plug has been inserted beyond the balls serving as the locking element, and the compression spring has displaced the balls radially inward through the sleeve, causing the ball to engage the slant rear surface of the forward end head portion of the plug.

DESCRIPTION OF THE PREFERRED EMBODIMENTS

A first embodiment of the plug-socket assembly according to the present invention will be explained with reference to FIGS. 1 to 4A. In the following description, the term "axial direction" means a "direction along the longitudinal axis of the plug insertion hole" or a direction parallel thereto, and the term "radial direction" means a "direction extending radially" from the "axial direction".

FIG. 1 is a longitudinal sectional view of a first embodiment of a plug-socket assembly 10. FIGS. 2A to 2C are views for explaining the operation of the plug-socket assembly 10. FIG. 3 is a schematic cross-sectional view as seen from the line III-III in FIG. 1. FIG. 4A is a fragmentary longitudinal sectional view of a sleeve.

As shown in FIG. 1, the plug-socket assembly 10 includes a plug 20 and a socket 30 that receives and secures the plug 20. The socket 30 has a socket body 31 having a plug insertion hole 311, and a locking element (assuming the form of balls in the illustrated example; hereinafter referred to simply as "balls") 32 fitted to the socket body 31 so as to be displaceable in the radial direction of the plug insertion hole 311. The socket 30 further has a locking element-actuating member (assuming the form of a sleeve in the illustrated example; hereinafter referred to simply as "sleeve") 33 fitted to the outside of the socket body 31 so as to be displaceable in the axial direction of the plug insertion hole 311, and a resilient member (assuming the form of a compression coil spring in the illustrated example; hereinafter referred to simply as "compression spring") 34 that urges the sleeve 33 toward an inlet 313 of the plug insertion hole 311.

The socket 30 is fixed to a desired place, e.g. a wall W, with a bolt B or the like.

An annular space 341 is formed between the inner periphery of the sleeve 33 and the outer periphery of the socket body 31, and the compression spring 34 is installed in the space 341 and compressed by a stop ring 35 secured to the socket body 31. The compression spring 34 urges the sleeve 33 to abut against a stopper flange 314 provided at the end of the plug insertion hole 311 closer to the inlet 313.

The socket body 31 is provided with ball receiving holes 315 radially extending through the socket body 31. The balls 32 are received in the ball receiving holes 315 so as to be displaceable in the radial direction. As shown in FIG. 3, the ball receiving holes 315 are provided at a plurality of equally spaced positions (4 positions in this embodiment) along the circumferential direction. The ball receiving holes 315 are tapered radially inward of the socket body 31 to prevent the balls 32 from falling off. The balls 32 are substantially in contact with a sliding surface 332 of the sleeve 33 (described later) and project radially inward of the socket body 31 when the plug 20 is not inserted in the socket 30 (see FIG. 1).

The plug 20 has a forward end head portion 21 that is slidably inserted into the plug insertion hole 311 of the socket 30. The plug 20 further has a rear end flange 22 and a reduced-diameter portion 23 located between the forward end head portion 21 and the rear end flange 22. The forward end head portion 21 has a slant front surface 211 and a slant rear surface 212, which extend radially inward toward the front and rear ends, respectively, of the forward end head portion 21, and a flat surface 213 located between the slant front surface 211 and the slant rear surface 212.

As shown in FIGS. 1 and 4A, the sleeve 33 of the socket 30 is provided on the inner side thereof with a locking element sliding surface (i.e. a sliding surface that is in sliding contact with the balls 32; hereinafter referred to simply as "sliding surface") 332. The sliding surface 332 is sloped or extends radially outward in the urging direction in which the sleeve 33 is urged by the compression spring 34.

The sliding surface 332 of the sleeve 33 of the socket 30 is located at a position where it is substantially in contact with the balls 32 when the plug 20 is not inserted in the plug insertion hole 311 (FIG. 1). The sliding surface 332 engages the balls 32 at a first portion P1 (FIGS. 4A and 1), thereby causing the balls 32 to project into the plug insertion hole 311 by a predetermined amount.

To insert the plug 20 into the plug insertion hole 311, an operator displaces the sleeve 33 leftward (FIG. 2A), as viewed in FIGS. 1 and 2, so that the balls 32 are displaced radially outward by the slant front surface 211 of the forward end head portion 21 of the plug 20 inserted into the plug insertion hole 311, and the flat surface 213 of the forward end head portion 21 is inserted beyond the balls 32. That is, in the illustrated example, the sliding surface 332 has a second portion P2 (FIGS. 4A and 2A) for allowing the balls 32 to be displaced radially outward as stated above.

The operator releases the sleeve 33 when the forward end head portion 21 of the plug 20 has been inserted beyond the balls 32. Consequently, the sleeve 33 is displaced rightward by the compression spring 34, and the sliding surface 332 presses and engages the balls 32 at a third portion P3 located between the first portion P1 and the second portion P2 (FIGS. 4A and 2B), thus causing the balls 32 to press and engage the slant rear surface 212 of the forward end head portion 21 of the plug 20. In this state, the plug 20 is drawn into the plug insertion hole 311 by the urging force of the compression spring 34 applied thereto through the balls 32 and the slant rear surface 212. In the illustrated example, a plate-shaped article 40 is clamped between the flange 22 at the plug rear end and the stopper flange 314 of the socket 30 and firmly held without play by the drawing force acting on the plug 20.

The sliding surface 332 has a fourth portion P4 extending horizontally between the second portion P2 and the third portion P3 (FIG. 4A). The fourth portion P4 is intended to act as follows. When an external pulling force is applied to the plug 20, the sleeve 33 is displaced leftward by the balls 32 pressed radially outward by the slant rear surface 212 of the plug forward end head portion 21. At this time, when the balls 32 come in engagement with the fourth portion P4 (FIG. 2C), there is no longer leftward force applied to the sleeve 33 from the balls 32 through the sliding surface 332. Thus, the sleeve 33 is prevented from being further displaced leftward. That is, the fourth portion P4 prevents the pulling out of the plug 20.

FIGS. 4B and 4C show modifications of the fourth portion P4 of the sliding surface 332. That is, the fourth portion P4 in FIG. 4B is a recess that is curved radially outward. The fourth portion P4 in FIG. 4C is a slant surface facing opposite to the urging direction of the compression spring 34. These fourth portions P4 are adapted so that when the balls 32 engage either of the fourth portions P4, force acting in the direction opposite to the urging direction of the compression spring 34 will not be transmitted to the sleeve 33 from the balls 32. Thus, the fourth portions P4 have an action similar to the above-described action of preventing the plug 20 from being pulled out undesirably, which is performed by the fourth portion P4 shown in FIG. 4A.

To unlock the plug 20 from the socket 30, the sleeve 33 is forced to move leftward against the urging force of the compression spring 34 by a manual operation, for example. By doing so, the plug 20 can be readily disengaged from the socket 30.

A second embodiment of the plug-socket according to the present invention will be explained with reference to FIGS. 5 to 9. FIG. 5 is a longitudinal sectional view of the second embodiment of the plug-socket assembly 10. FIG. 6 is a schematic cross-sectional view as seen from the line VI-VI in FIG. 5. FIG. 7 is a schematic cross-sectional view as seen from the line VII-VII in FIG. 5. FIG. 8 is a schematic cross-sectional view as seen from the line VIII-VIII in FIG. 5. FIG. 9 is a view for explaining the operation of the plug-socket assembly 10 according to the second embodiment.

The basic arrangement of the plug-socket assembly 10 is substantially the same as that of the foregoing first embodiment. Therefore, only the points in which the second embodiment differs from the first embodiment will be explained below.

In the plug-socket assembly 10 according to the second embodiment, the socket body 31 has, as shown in FIGS. 5 to 7 and 9, first and second sleeve-actuating balls 32a and 32b (see FIGS. 5 and 7) for displacing the sleeve 33 in addition to the above-described balls 32 serving as the locking element. The first and second sleeve-actuating balls 32a and 32b are provided closer to the inlet 313 of the plug insertion hole 311 than the balls 32. More specifically, the first sleeve-actuating balls 32a are located closer to the plug insertion hole inlet than the balls 32. The second sleeve-actuating balls 32b are located even more closer to the plug insertion hole inlet than the balls 32. The first sleeve-actuating balls 32a are circumferentially spaced from the balls 32 by a required angle, as shown in FIGS. 6 and 7, so as not to interfere with the balls 32.

When the plug 20 is inserted into the plug insertion hole 311 (FIG. 9A), the slant front surface 211 of the plug 20 first engages the second sleeve-actuating balls 32b and displaces them radially outward (FIG. 9B) so that the second sleeve-actuating balls 32b engage and press against the sliding surface 332 at a position between the fourth portion P4 and the second portion P2, thereby displacing the sleeve 33 in the direction opposite to the urging direction of the compression spring 34 (FIG. 9C). Subsequently, the slant front surface 211 of the plug 20 engages the first sleeve-actuating balls 32a (FIG. 9D) and displaces them radially outward (FIG. 9E) so that the first sleeve-actuating balls 32a engage and press against the sliding surface 332 at a position between the fourth portion P4 and the second portion P2, thereby displacing the sleeve 33 in the direction opposite to the urging direction of the compression spring 34. Finally, the slant front surface 211 of the plug 20 engages the balls 32 serving as the locking element and displaces them radially outward (FIG. 9F) so that the balls 32 engage and press against the sliding surface 332 at a position between the fourth portion P4 and the second portion P2, thereby displacing the sleeve 33 in the direction opposite to the urging direction. Consequently, the balls 32 engage the second portion P2 to allow the flat surface 213 of the forward end head portion 21 of the plug 20 to be inserted into the plug insertion hole 311 beyond the balls 32. When the flat surface 213 of the forward end head portion 21 of the plug 20 has been inserted beyond the balls 32, the sleeve 33 is pressed and displaced rightward by the urging force of the compression spring 34, causing the balls 32 to press and engage the slant rear surface 212 of the forward end head portion 21 of the plug 20. Thus, the plug 20 is forced to be drawn into the plug insertion hole 311, thereby being connected and locked.

In the plug-socket assembly according to this embodiment, the plug can be inserted without moving the sleeve leftward in advance. That is, by simply inserting the plug, the sleeve is moved to allow the plug to be inserted so as to be connected (FIG. 9G).

Although some embodiments of the plug-socket assembly according to the present invention have been described above, the present invention is not necessarily limited to these embodiments but can be modified in a variety of ways without departing from the scope of the invention set forth in the appended claims. For example, the plug-socket assembly according to the second embodiment has the first and second sleeve-actuating balls for moving the sleeve 33 leftward. In other words, these sleeve-actuating balls are provided to move the sleeve as far as a position where the portion of the sliding surface between the second portion and the fourth portion radially is aligned with the balls 32 serving as the locking element. Therefore, only either the first or second sleeve-actuating balls may be used to move the sleeve so that the sliding surface and the balls 32 are radially aligned with each other as stated above. Further, in the foregoing embodiments, a plate-shaped article is arranged to be clamped between the flange provided at the rear end of the socket and the flange provided at the rear end of the plug. The arrangement may, however, be such that the article is attached directly to the plug by some means instead of being clamped as stated above. In such a case, the flange at the rear end of the plug is arranged to abut against the rear end of the socket, whereby the flanges at the plug rear end and the socket rear end can be firmly secured to each other without play by the force applied by the compression spring to the plug to draw it into the plug insertion hole. Accordingly, the article can be attached even more surely. Although in the foregoing embodiments, the socket is fixed to a wall, for example, the arrangement may be such that the plug is fixed to the wall and an article to be attached is secured to the socket, thereby attaching the article to the wall.

The plug-socket assembly according to the present invention is usable not only to attach a desired article to a wall or the like but also to serve in a plug-socket assembly type connector to prevent disconnection of the plug and the socket that might otherwise be caused by an excessive external force unexpectedly applied to the connected plug and socket.

What is claimed is:

1. A plug-socket assembly comprising a plug and a socket that receives and secures said plug;

said socket comprising:
   a socket body having a plug insertion hole;
   a locking element fitted to said socket body so as to be displaceable in a radial direction of said plug insertion hole;
   a locking element-actuating member fitted to an outside of said socket body so as to be displaceable in an axial direction of said plug insertion hole; and
   a resilient member that urges said locking element-actuating member in said axial direction;
   said plug having a forward end head portion that is slidably inserted into said plug insertion hole of said socket, and a reduced-diameter portion following said forward end head portion;
   said forward end head portion having a slant rear surface that extends radially inward toward a rear end thereof as viewed in a plug insertion direction;
   said reduced-diameter portion extending rearward of said plug from a rear end of the slant rear surface;
   wherein said locking element-actuating member of said socket has a locking element sliding surface provided on an inner side thereof, said locking element sliding surface extends radially outward in an urging direction in which said locking element-actuating member is urged by said resilient member, so that said locking element sliding surface pressingly engages said locking element by being urged in said axial direction by said resilient member;
   said locking element sliding surface of said locking element-actuating member of said socket having:
   a first portion that engages said locking element to apply force to said locking element in order to project said locking element as far as a first position in said plug insertion hole when said plug is not inserted in said plug insertion hole;
   a second portion that is spaced apart from said first portion by a predetermined distance in said urging direction, said second portion being arranged so that when engaging said second portion, said locking element is positioned at a second position that is radially outward of said first position to allow the forward end head portion of said plug to be inserted into said plug insertion hole beyond said locking element;
   a third portion that is closer to said first portion than said second portion, said third portion being arranged such that when said forward end head portion of said plug is inserted beyond said locking element, said third portion pressingly engages said locking element that is engaged by the slant rear surface of the forward end head portion of said plug at a position radially outward away from said reduced-diameter portion where said third portion cannot contact said reduced-diameter portion; and
   a fourth portion that engages said locking element at an intermediate position between said second portion and said third portion and that is configured so that even if said locking element applies a radially outward force to said locking element sliding surface, said locking element-actuating member will not be forced to move in a direction opposite to said urging direction.

2. A plug-socket assembly according to claim 1, wherein a slope between said first portion and said fourth portion is less steep than a slope between said fourth portion and said second portion.

3. A plug-socket assembly according to claim 1, wherein said fourth portion extends parallel to said axial direction.

4. A plug-socket assembly according to claim 1, wherein said fourth portion is configured to face opposite to said urging direction.

5. A plug-socket assembly according to claim 1, wherein said fourth portion is a recess curved outward in said radial direction.

6. A plug-socket assembly according to claim 1, wherein the urging direction in which said locking element-actuating member is urged by said resilient member is opposite to said insertion direction;

said forward end head portion of said plug having a slant front surface extending radially inward in said plug insertion direction;
   said socket body having:
   a first ball provided closer to an inlet of said plug insertion hole than said locking element; and
   a second ball provided closer to the inlet than said first ball;
   wherein the slant front surface of said plug first engages said second ball when said plug is inserted into said plug insertion hole, and displaces said second ball radially outward so that said second ball pressingly engage said locking element sliding surface between said fourth portion and said second portion, thereby displacing said locking element-actuating member in said insertion direction, and subsequently, said slant front surface engages said first ball and displaces it radially outward so that said first balls pressingly engage said locking element sliding surface between said fourth portion and said second portion, thereby displacing said locking element-actuating member in said insertion direction, and finally, said slant front surface engages said locking element and displaces it radially outward so that said locking element pressingly engages said locking element sliding surface between said fourth portion and said second portion, thereby displacing said locking element-actuating member in said insertion direction so that said locking element engages said second portion.

7. A plug-socket assembly according to claim 1, wherein said plug has at a rear end thereof a flange extending in said radial direction, said flange being arranged to clamp and secure a desired member between itself and a rear end of said socket body in a state where said locking element is pressed and engaged with said slant rear surface of said forward end head portion of said plug as inserted into said plug insertion hole.

8. A plug-socket assembly according to claim 1, wherein said plug has at a rear end thereof a flange extending in said radial direction, said flange being pressed and engaged with a rear end of said socket body in a state where said locking element is pressed and engaged with said slant rear surface of said forward end head portion of said plug as inserted into said plug insertion hole, and wherein a desired member is connected and secured to said plug.

9. A plug-socket assembly according to claim 1, wherein the urging direction in which said locking element-actuating member is urged by said resilient member is opposite to said insertion direction;

said forward end head portion of said plug having a slant front surface extending radially inward in said plug insertion direction;

said socket body having a first ball closer to an inlet of said plug insertion hole than said locking element;

wherein the slant front surface of said plug engages said first ball when said plug is inserted into said plug insertion hole, and displaces said first ball radially outward so that said first ball pressingly engage said locking element sliding surface between said fourth portion and said second portion, thereby displacing said locking element-actuating member in said insertion direction to move said locking element to a position between said fourth portion and said second portion, and said slant front surface of the forward end head portion as inserted pressingly engages said locking element in said position between said fourth portion and said second portion.

10. A plug-socket assembly according to claim 9, wherein said socket body has a flange extending radially outward so that a forward end of said locking element-actuating member, as viewed in the urging direction in which it is urged by said resilient member, engages said flange when said plug is not inserted.

* * * * *